Dec. 16, 1924.  1,519,784
C. S. LOMAX ET AL
METHOD OF PRODUCING A SOLID SMOKELESS FUEL FROM BITUMINOUS COAL AND LIGNITE
Filed Feb. 1, 1924   2 Sheets-Sheet 1
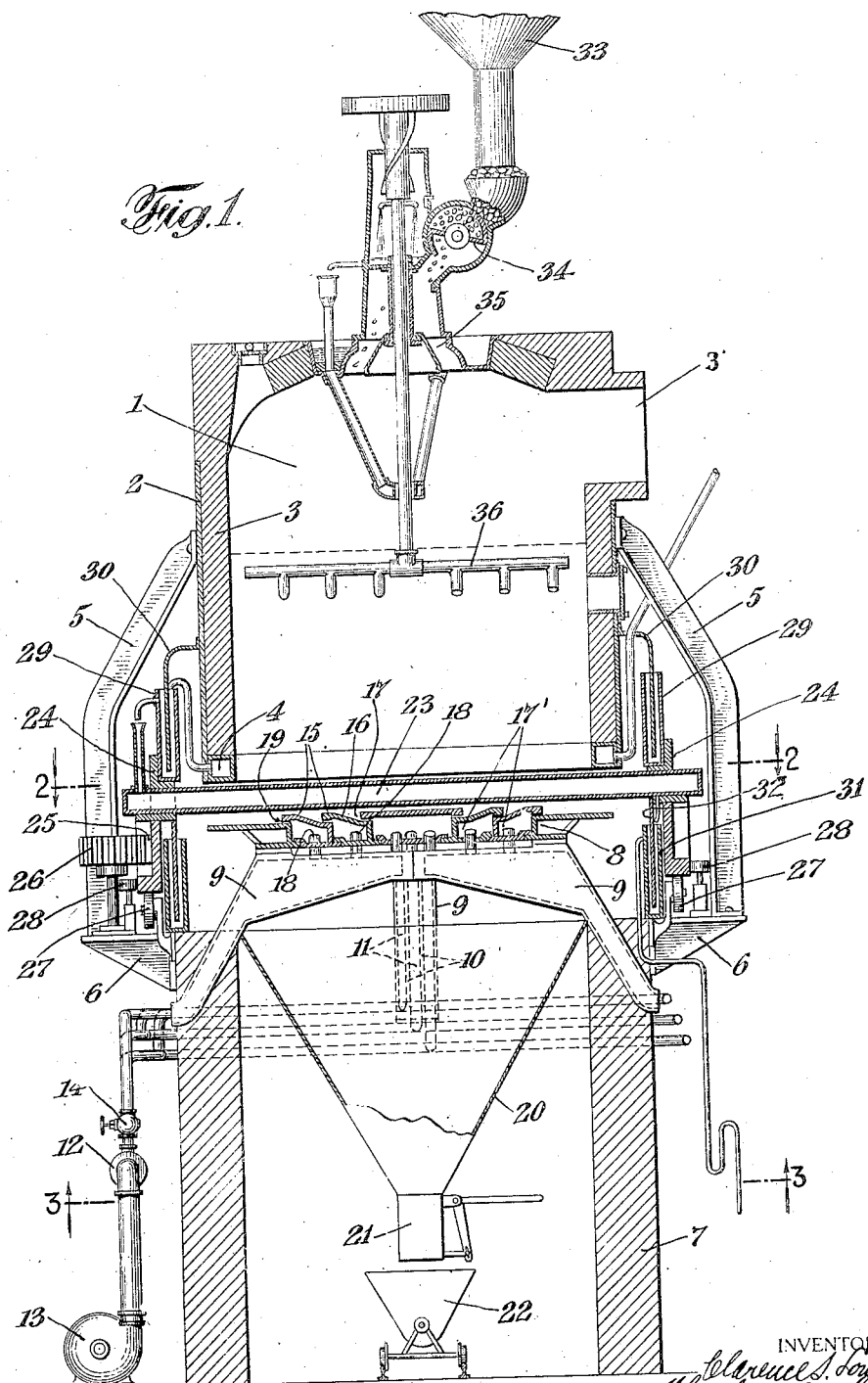

Dec. 16, 1924. 1,519,784
C. S. LOMAX ET AL
METHOD OF PRODUCING A SOLID SMOKELESS FUEL FROM BITUMINOUS COAL AND LIGNITE
Filed Feb. 1, 1924   2 Sheets-Sheet 2
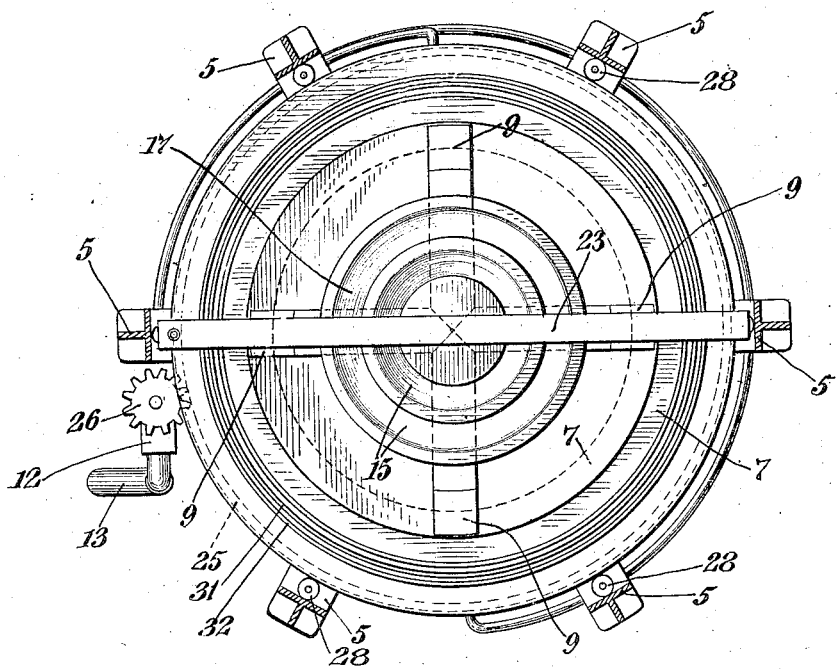
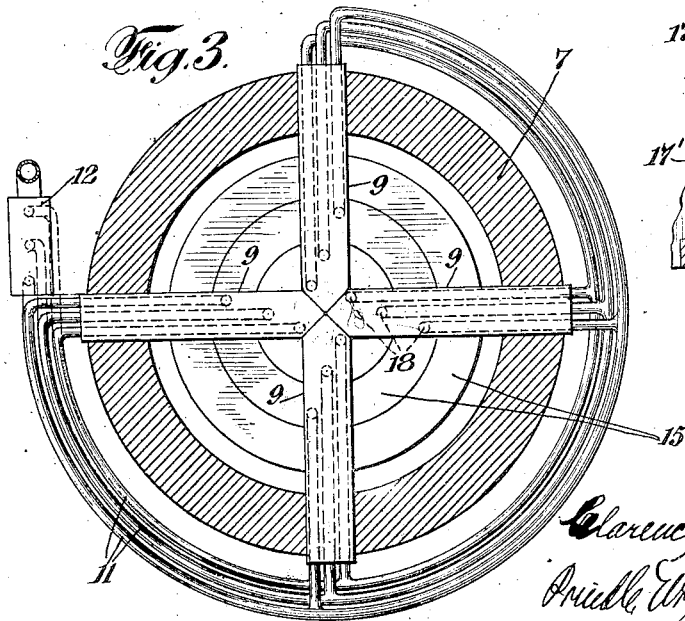
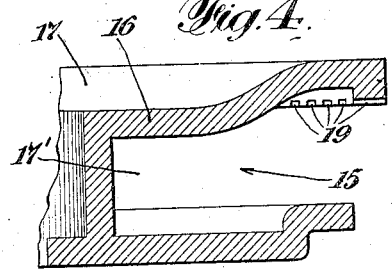

Patented Dec. 16, 1924.

1,519,784

UNITED STATES PATENT OFFICE.

CLARENCE S. LOMAX, OF BROOKLYN, NEW YORK, AND WHEADON M. GRANT, OF BIRMINGHAM, ALABAMA, ASSIGNORS TO ILLINOIS ANTHRACITE CORPORATION, OF NEW YORK, N. Y., A CORPORATION OF DELAWARE.

METHOD OF PRODUCING A SOLID SMOKELESS FUEL FROM BITUMINOUS COAL AND LIGNITE.

Application filed February 1, 1924. Serial No. 689,857.

*To all whom it may concern:*

Be it known that we, CLARENCE S. LOMAX, a citizen of the United States, and a resident of Brooklyn, in the county of Kings and State of New York, and WHEADON M. GRANT, a citizen of the United States, and a resident of Birmingham, in the county of Jefferson and State of Alabama, have invented a certain new and useful Method of Producing a Solid Smokeless Fuel from Bituminous Coal and Lignite, of which the following is a specification.

This invention relates to a new and improved method of producing solid smokeless fuel from bituminous coal and lignite and the primary purpose of the invention is the provision of such a method or process whereby a fuel of this character may be rapidly and economically produced.

Broadly speaking the process itself involves the feeding of the material to be treated at a relatively fast rate into a retort, gas producer or other suitable heating chamber, maintaining the material therein in a bed of substantially constant depth, continuously stirring and agitating the material while it is being treated, subjecting the material to restricted combustion to such an extent and for a sufficient period of time to consume only a part of the volatile matter therein and none of the fixed carbon and to distil out an additional part of the volatile matter, and continuously discharge the treated material from the apparatus while it still retains a substantial percentage of volatile matter. The percentage of volatile matter remaining in the solid product discharged from the apparatus is regulated so that this product forms a smokeless fuel of high heating value. In carrying out this process air, or combined air and gas, is fed to the bed of material at such a rate as to consume only part of the volatile matter distilled from the coal and none of the fixed carbon.

This method or process may be carried out in various forms of apparatus specially constructed for the same or it may be carried out in the standard forms of gas producers at present in extensive use with little or no change in the construction thereof. The method of operation of an apparatus in the practice of this process is radically different from the present practice of operating gas producers.

In order to better describe the method or process and to show one form of apparatus adapted to practice the same, we have shown in the drawings a standard type of gas producer which has been re-constructed and redesigned in part for the practice of this process. It is to be expressly understood, however, that this illustrated apparatus is merely one form of many which may be used to practice this process and that it is shown merely for the purpose of facilitating the disclosure and that we are not to be limited in any way whatsoever by the construction of the apparatus shown, for as stated hereinbefore the method or process may be practiced in various types and forms of apparatus.

In these drawings—

Figure 1 is a vertical cross section through a standard type of gas producer reconstructed so as to carry out the process or method of this invention.

Figure 2 is a horizontal cross section taken through the apparatus shown in Figure 1 substantially on the line 2—2 and looking in the direction of the arrows.

Figure 3 is a horizontal cross section of the apparatus shown in Figure 1 taken substantially on line 3—3 of Figure 1 and looking upwardly in the direction of the arrows.

Figure 4 is a vertical section on an enlarged scale of one of the grate sections.

Generally speaking, in order that a substantial yield of tarry oils may be obtained from the distillation of coal certain requirements must be fulfilled. The first of these is that the coal must be raised in temperature sufficiently high to bring about distillation, but not high enough to cause a molecular disruption of the volatiles evolved, and preferably the coal should be raised to a temperature higher than that actually necessary to distill the coal but still lower than that of molecular disruption, in order that cracking and distillation may be simultaneous operations and so as to yield an oil of lighter specific gravity than would result at lower temperatures. The hydrocarbon vapors should be immediately swept into a zone colder than that of distillation immediately they are evolved in order that no molecular disruption thereof may take place. It is also essential that these hydrocarbons be produced in an atmosphere substantially free of oxygen in order that no combustion of them may result.

In distilling any coal after the major portion of the oils have been evolved at low temperatures there remain certain compounds which will not be evolved at low temperatures and are of such a nature that when the coal has been heated to a sufficient temperature to eliminate them they suffer a molecular disruption, leaving the bulk of their carbon with the original fixed carbon of the coal and the volatiles evolved consist largely of hydrogen and other non-condensible gases.

Our process is primarily intended to produce a solid fuel, which shall contain substantially all of the fixed carbon originally in the coal, as well as a substantal percentage of volatle matter (approximately 12 per cent); and, secondarily, to produce as much liquid hydrocarbons as possible, and to produce them under conditions which will result in the lightest oil obtainable and with a minimum breaking up of liquid hydrocarbons into non-condensible gases. We obtain these results by the following means:—

We keep the bed of material being distilled relatively shallow, which results in maintaining the upper part of this bed at temperatures varying from 400 to 500 degrees C., which, we find to be the most satisfactory temperature for the best results of distillation. Under normal conditions, caking coal introduced into such a temperature zone would melt and coke and tend to form large masses, which would be impenetrable to the heating medium and would result in noticeable differences in the temperature of the outer surface and the center of such masses. We provide a stirring mechanism which is operated so vigorously that the material at all times is prevented from forming large masses and is at all times kept in a highly divided condition. As mentioned above, the residual products of distillation are largely hydrogen and other non-condensible gases and we make use of the products of this class of material in two ways:

As the coal after giving up its oils passes downward in the producer and its temperature is increased to the point where such gases are being evolved, these gases furnish the fuel whose combustion supplies the heat necessary for carrying out the process, and the continued evolution of this gas forms an envelope about each particle of distilled coal in the zone of combustion and the combustion due to the incoming air consumes this gas rather than any of the solid carbon present. Due to the finely divided condition of the material brought about by the stirrer, as mentioned above, there results a great multiplicity of passages between the particles of material in which combustion can take place and a large increase in the total surfaces of material exposed to the heat and a more uniform and complete distillation of the particles of material and limits the vertical range of the zone in which these gases are burning to a few inches, and results in the virtually complete union of the oxygen of the air with the above mentioned gases before the products of combustion rise into that zone in which distillation is taking place. By this means a careful and accurate regulation of the conditions under which distillation at any point is taking place is provided.

Referring now to the drawings we show a producer 1 which includes a cylindrical metallic shell 2 having a brick lining 3 supported on a hollow cast iron ring or annulus 4. A discharge opening 3' is provided in the producer for the passage of the volatiles distilled in the producer for their subsequent treatment according to customary practice. This shell 2 is also supported by means of suitable arms or brackets 5 which are in turn supported by brackets 6 on a suitable foundation or other supporting means 7.

A grate 8 is mounted and supported beneath the bottom of the cylindrical shell 2 and spaced therefrom, this grate being supported in position by means of a plurality of pedestals 9 which are hollow and partitioned as at 10 to provide a plurality of air ducts or passages 11, these air ducts or passages being connected to a distributing pipe or duct 12 connected to a blower 13 and having suitable valves 14 therein for regulating the passage of air therethrough. The grate illustrated is of peculiar form, being composed of a plurality of concentric rings 15 which interfit and support each other as shown so as to provide a continuous and extended grate surface. The top walls 16 of these rings 15 are curved upwardly so that the ring is saucerlike in appearance and to provide a plurality of annular channels 17 in the grate as a whole. Each of these concentric rings 15 is hollow as shown and, therefore, forms a circular compartment 17', within the grate. These compartments are for the purpose of receiving air from the air ducts 11, these air ducts being provided with suitable nozzles 18 to supply air into the circular compartments 17'. Each duct 11 is for the purpose of supplying air to one of the circular compartments 17' and, therefore, a regulation of the valve for this duct controls the quantity of air supplied to the particular circular compartment. As shown in detail in Figure 4 of the drawing the depending lip of the top wall of each of the grate sections 15 is machined out on its under surface in the form of a plurality of curved grooves or slots 19 so as to provide a plurality of air discharge passages leading from the circular compartments within the grate into the annular channels 17. We have referred so far to supplying air into the grate and to the grate surface but it is to be understood that if desired and under certain conditions in the operation of the apparatus a suitable quantity of gas may be mixed with the air. This results in more efficient operation as this gas is consumed instead of the more valuable volatiles distilled from the coal and which therefore may be recovered.

Beneath the grate is positioned a discharge hopper 20 having an air-tight discharge means 21 which is adapted to discharge the treated material into a conveying medium 22.

A discharge mechanism is positioned above the grate and below the lower end of the shell 2 and in the apparatus illustrated takes the form of a rotatable hollow rectangular bar which is supported at each end in a metallic ring or sleeve 24 which is provided with an annular rack 25 to be driven by a pinion 26. The ring 24 is supported in position by means of a plurality of rollers 27 and 28. On top of the ring 24 we provide a water seal 29 in which is positioned a stationary lip or flange 30 which is connected to the shell 2, it being understood that the water seal itself rotates with the ring 24 and the discharge bar 23. A water seal 31 is positioned below the bar 23 and supported on the foundation 7 or in any other suitable manner and receives a lip or curtain 32 which is suitably attached to or supported by the ring 24 so as to move therewith.

In the upper part of the apparatus we illustrate a feed hopper 33 which connects with an automatically operated continuous feeding mechanism 34 which discharges the material on a distributing bell 35, whereby it is evenly distributed over the surface of the bed of material in the apparatus. In association with this feeding mechanism we also illustrate a stirring and agitating mechanism 36 which is provided with operating means for rotating and moving the same up and down within the bed or body of material whereby the entire body or mass of material in the apparatus is thoroughly and completely stirred during the entire course of its treatment therein.

We have described in some detail the particular construction illustrated in the drawing and a large part of the apparatus illustrated is of standard construction and used in gas producing at the present time. However, the usual method of operating this apparatus and the purpose for which it is operated as well as the products resulting therefrom are essentially different from the products resulting from the practice of our method or process. Further, while we have shown one type of gas producer arranged so as to practice our process, it is to be understood that various other types of apparatus may be utilized for this purpose, the various steps of the process as hereinafter specified in the claims being the essential factors in producing the desired results.

The practice of the process or method will now be described. The material to be treated, that is bituminous coal or lignite, is fed into the apparatus by a suitable continuously operated feeding mechanism so as to provide and maintain a bed of material on the grate. This bed of material is maintained at a substantially constant depth, this depth being such that the stirring and agitating mechanism will agitate and mix substantially the entire body of material being treated. In the drawings this depth is indicated by the line slightly above the stirrer or agitator. The discharge mechanism or bar 23 is operated at a relatively fast rate so that the treated material is continuously discharged from the producer or apparatus, the rate of operation of the discharge mechanism being coordinated with the rate of operation of the feeding mechanism, so as to maintained a bed of substantially constant depth. Air or combined air and gas as the case may be is supplied through the air ducts and grate as previously described in sufficient quantities so as to obtain the requisite combustion only of part of the volatiles distilled from the coal. The stirring and agitating mechanism is continuously operated so as to keep the material churned and separated into a finely divided condition so that it is uniformly treated throughout. The combustion is regulated so that none of the fixed carbon of the material is consumed and only a part of the volatiles distilled from the coal. The material being treated is subjected to such temperature immediately upon being fed to the bed that chemical reactions set in at once and are maintained during the entire period of treatment of any one particle of material. In other words, the temperature is maintained so as to raise the material to a point above the cracking point of the hydrocarbons distilled therefrom. This temperature is, however, much lower than that at which such hydrocarbons dissociate into permanent gases, carbon and water vapor. The process of cracking referred to herein is defined as the breaking up of molecules of a heavier hydrocarbon into two or more molecules of a lighter hydrocarbon. However, the material is subjected to this temperature and treatment for a comparatively short period of time and the solid product is discharged from the apparatus with a substantial percentage of volatile and substantially all of the fixed carbon retained. The volatiles which are distilled from the material and are not consumed are carried off for treatment according to the customary practice and these volatiles due to the relatively low rate of air input into the producer or apparatus are of very high quality and calorific value.

The solid material discharged from the apparatus will be in the form of a char. It is not like coke in that it is a friable substance, dark in color, and not silvery in appearance as is the case with coke. Due to the percentage of volatile remaining therein it has a higher heating value than anthracite. Due to its physical construction it may be readily ground or pulverized and briquetted and, therefore, has an extensive market and utility as a substitute for anthracite. The percentage of volatile therein is maintained sufficiently low to prevent the emission of smoke when being consumed.

It is to be understood that the rate of discharge of the solid material from the apparatus, the rate of feeding the material into the apparatus, the time of treatment of the material in the apparatus, and the quantity of air or air and gas admitted into the apparatus for the purpose of promoting combustion, may be and will be varied according to working conditions of the material being treated.

We have referred herein to the fact that none or substantially none of the fixed carbon is consumed by combustion while the material is being treated and it is to be understood that this is the ideal condition, but that in practice it is possible that relatively small amounts of the carbon may be consumed but if so, the quantity is inappreciable.

In the claims we use the term "carbonaceous material." This is to be understood as referring to organic material such as bituminous coal, lignite, or the like.

We claim:—

1. A method of producing a solid smokeless fuel from carbonaceous material which consists in feeding the material to be treated continuously into a closed chamber maintaining a relatively shallow bed of material therein, subjecting the material to combustion so that a comparatively small percentage of the volatile matter and none of the fixed carbon is consumed and discharging the treated material from the chamber while it retains a substantial percentage of volatile matter therein.

2. A method of producing a solid smokeless fuel from carbonaceous material, which includes maintaining a bed of material of substantially constant depth in a closed chamber, producing combustion within the bed of material with an input of air so reduced as to consume only a portion of the volatile matter distilled from the material and substantially none of the fixed carbon, and discharging the treated material while it retains a substantial percentage of volatile matter.

3. A method of producing a solid smokeless fuel from carbonaceous material consisting in continuously feeding material into a closed chamber and maintaining a relatively shallow bed thereof, subjecting the material to combustion so that a comparatively small percentage of the volatile matter only is consumed and substantially none of the fixed carbon, continuously stirring and agitating the material during treatment, continuously discharging the material at a relatively fast rate and while it still retains a substantial percentage of volatile matter.

4. A method of producing a solid smokeless fuel from carbonaceous material consisting in subjecting the material to combustion whereby a small quantity of the volatile matter and none of the fixed carbon is consumed, continuously stirring and agitating the material and discharging the material in the form of a "char" having a substantial percentage of volatile matter therein.

5. A method of producing a solid smokeless fuel from carbonaceous material which includes maintaining a bed of material in a closed chamber, heating the bed of material by combustion within itself, positively stirring and agitating said material within the bed so that it is maintained in a finely divided condition, and discharging the solid material while it retains a substantial percentage of volatile matter.

6. A method of producing a solid smokeless fuel from carbonaceous material consisting in maintaining a relatively shallow bed of material in a closed chamber, subjecting the material to combustion but confining the combustion to a relatively small percentage of the volatile matter distilled therefrom and discharging the material while it still retains a substantial percentage of volatile matter therein.

7. A method of producing a solid smokeless fuel from carbonaceous material which includes maintaining a bed of material, continuously agitating and stirring the bed of material within itself so that it is maintained in a finely divided condition, subjecting the material to combustion so that a comparatively small portion of the volatile matter distilled therefrom only is consumed and so that there is a continuous chemical change throughout the whole body of material and discharging the treated solid material continuously while it still retains a substantial percentage of volatile matter.

8. A method of producing a solid smokeless fuel from carbonaceous material in a gas producer structure, which includes feeding the material at a relatively fast rate into the producer and maintaining the material therein in a bed of substantially constant depth, subjecting the material to combustion so as to consume a relatively small proportion of the volatile matter distilled therefrom and none of the fixed carbon, continuously discharging the material at a relatively fast rate and while it still retains a substantial percentage of volatile matter.

9. A method of producing a solid smokeless fuel from carbonaceous material in a gas producer structure, which includes feeding the material at a relatively fast rate into the producer and maintaining the material therein in a bed of substantially constant depth, subjecting the material to combustion so as to consume a relatively small proportion of the volatile matter distilled therefrom and none of the fixed carbon, continuously discharging the material at a relatively fast rate and while it still retains a substantial percentage of volatile matter and continuously stirring and agitating the body of material during its treatment.

10. A method of producing a solid smokeless fuel from carbonaceous material in a gas producer structure, which includes maintaining a bed of material of substantially constant depth in the producer, subjecting the material to combustion within the bed and supplying air to the combustion area or zone at such a rate as to consume a comparatively small amount of the volatile matter distilled from the material, and continuously discharging the material from the producer while it still retains a substantial percentage of volatile matter therein.

11. The method of producing a solid smokeless fuel from carbonaceous material in a gas producer structure, which includes feeding the material continuously into the producer and maintaining a bed therein, subjecting the material to combustion and feeding air into the producer to cause combustion at such a rate as to consume a comparatively small amount of the volatile matter distilled from the material and none of the fixed carbon, stirring and agitating the material during this course of treatment in the producer, and continuously discharging the material from the producer at a relatively fast rate and while it still retains a substantial percentage of volatile matter.

12. The method of producing a solid smokeless fuel from carbonaceous material in a gas producer structure, which includes maintaining a bed of material in the producer, subjecting the material to combustion and supplying air to the combustion area or zone at such a rate as to consume a comparatively small amount of the volatile matter distilled from the material, stirring and agitating the body of material, and discharging the material from the producer at a relatively fast rate and while it still retains a substantial percentage of volatile matter.

13. A method of producing a solid smokeless fuel from carbonaceous material which includes the steps of agitating a body of material, subjecting the material to combustion and supplying air thereto at such a rate as to consume part of the volatile matter distilled from the material only and substantially none of the fixed carbon, and discharging the solid material while it still retains a substantial percentage of volatile matter therein.

14. A method of producing a solid smokeless fuel from carbonaceous material which includes the steps of agitating a body of material within itself, subjecting the material to combustion in a zone or area within itself and supplying air to the zone or area of combustion at such a rate as to consume part of the volatile matter distilled from the material only and substantially none of the fixed carbon, and discharging the solid material while it still retains a substantial percentage of volatile matter therein.

In testimony that we claim the foregoing, we have hereunto set our hands this 12th day of December, 1923.

CLARENCE S. LOMAX.
WHEADON M. GRANT.